UNITED STATES PATENT OFFICE.

RAYMOND B. PRICE, OF MISHAWAKA, INDIANA.

PROCESS OF MANUFACTURING ARTICLES FROM PLASTIC MATERIALS.

1,152,834. Specification of Letters Patent. Patented Sept. 7, 1915.

No Drawing. Application filed December 30, 1911. Serial No. 668,792.

*To all whom it may concern:*

Be it known that I, RAYMOND B. PRICE, a citizen of the United States, residing at Mishawaka, in the county of St. Joseph, State of Indiana, have invented new and useful Improvements in Processes of Manufacturing Articles from Plastic Materials, of which the following is a specification.

My invention relates to the manufacture of articles, such as tires, hose, rubber boots and shoes, and the like, from plastic materials, and has for its object to provide certain improvements in the process of vulcanizing or otherwise treating the same, and in the article produced, as will be hereinafter more fully set forth and claimed.

More specifically my invention relates to the character of the medium in which the article is subjected to the vulcanizing or setting operation, and is designed to provide a medium which, while possessing the necessary heat-transmitting qualities, will at the same time exert no deleterious effect on the article being treated.

It is well known in this art that certain fluids when used as heat-transmitting agents, and particularly water, tend to cause the plastic material to swell under the initial application of the heat, a condition interfering with obtaining the best results in the finished article.

It is my present purpose to employ a medium fluid under the treating temperature, and one which will have the effect of preventing the entrance of moisture into the material being treated, and will even tend to withdraw from the article being treated any moisture which it may contain, whereby all danger of marring the surface of the article is avoided. I have found in practice, for instance, that a solution of calcium chlorid possesses to a marked degree the desired characteristics, the same, so far as can be ascertained, acting in the process of vulcanization as a vulcanizing medium only, as distinguished from a vulcanizing agent.

In practice the article to be treated is subjected, in a bath of the medium employed, such, for instance, as calcium chlorid, to the action of heat applied in any suitable manner, such as by steam pipes, either internal or external of the vulcanizer, or by an exterior heating furnace until the operation is complete. I do not wish to confine myself, however, to the use of calcium chlorid as the heat-transmitting medium, as many other materials may be used for that purpose, it being essential only that they be fluid under the operating temperature. Thus, such agents as sulfur, solutions of barium nitrate, potassium acetate, calcium nitrate, potassium carbonate, caustic soda, caustic potash, glycerin, waxes and tars may be employed with satisfactory results. And a bath of fusible metal may even be employed, such as one composed of bismuth, 11 parts; lead, 8 parts, and tin, 3 parts, which is found to melt under temperature of about 205° F. I do not wish to limit myself, however, to this proportion of the metals, as the same may be varied at will so long as the melting point thereof will fall below the initial heat point of the treating operation.

I am aware that plastic material, such as rubber, has been subjected to the vulcanizing operation in a sulfur bath, but in that case the sulfur has acted not only as a vulcanizing medium, but also as a vulcanizing agent, a portion of the same becoming incorporated with the rubber during the vulcanizing operation, while the heat conveying function of the sulfur as a bath is incidental only. So far as I am aware, sulfur has never been used as a vulcanizing medium only, and in the practice of my present invention I contemplate the usual preliminary admixture with the plastic material of that proportion of sulfur necessary for the vulcanizing operation, thus relying upon the sulfur bath when used for no part of the sulfur necessary to unite with the plastic material during the vulcanizing operation. Under the above conditions a certain amount of free sulfur deposited at the surface of the rubber may preferably be removed by means well known in the art.

In an application filed by me June 19, 1911, Serial No. 634,030, and in a second application filed of even date herewith, Serial No. 668,791, I have described processes of treating plastic materials under a condition of pressure control, both internal and external, of the article being treated, and wish it to be understood that my present invention contemplates, in conjunction with any of the fluid baths hereinbefore referred to, the conjoint application of any of the vacuum or pressure controls described in said applications. Thus, it will be understood that an article, such as a boot or shoe, or a solid tire, or an automobile tire shoe, or rubber hose, may be treated in any of the fluid baths such as above described, and at the same time said fluid bath may be subjected to any degree of pressure that may be found desirable; and, furthermore, that the interior of the article may have its pressure controlled by the application of a vacuum or a pressure thereto, or by establishing communication with the atmosphere to permit the interior thereof to "bleed" to the atmosphere. In the case of an article such as a rubber hose, which is coated outside and inside, thus presenting two such surfaces, I contemplate separate control of the pressures thereon, as well as a separate control for the interior pressure between said surfaces. I also contemplate employing any of the hereinbefore described heat conveying mediums in the form of a bath into which a portion or all of the articles being treated may be immersed during the vulcanizing operation, which may be in the open, or in a chamber otherwise filled with any other medium, liquid or gaseous.

My invention is not limited to the vulcanization of rubber articles, as I may also treat articles formed of gutta-percha, balata, and the like, and in the treatment of such materials, as well as in the vulcanization of rubber, the term "setting" will be understood to mean the point of departure of the material from the plastic condition.

Having thus described my invention, what I claim as new and desire to secure by Letters Patent is:

1. The process of vulcanizing plastic material having incorporated therein the amount of sulfur necessary for its vulcanization, which consists in subjecting the same to the action of the vulcanizing heat in a medium fluid under the vulcanizing temperature and possessing such an affinity for moisture as will substantially prevent ingress of moisture to the material during the vulcanizing operation and simultaneously exerting a differential of external and internal pressure on the articles.

2. The process of vulcanizing plastic material having incorporated therein the amount of sulfur necessary for its vulcanization, which consists in subjecting the same to the action of the vulcanizing heat in a medium fluid under the vulcanizing temperature and possessing such an affinity for moisture as will not only prevent ingress of moisture to the material during the vulcanizing operation, but will also tend to withdraw from said material moisture contained therein and simultaneously exerting a differential of external and internal pressure on the material.

3. The process of vulcanizing a plastic article having incorporated therein the amount of sulfur necessary for its vulcanization, which consists in subjecting the unvulcanized plastic mass to the action of the vulcanizing heat in a medium with which the unvulcanized surface of the mass is in direct contact, said medium being fluid under the vulcanizing temperature and at such temperature exerting no deleterious effect on the material being treated, and simultaneously exerting a differential of external and internal pressure on the article.

4. The process of vulcanizing plastic material having incorporated therein the amount of sulfur necessary for its vulcanization, which consists in subjecting the unvulcanized plastic mass to the action of the vulcanizing heat in a medium with which the unvulcanized surface of the mass is in direct contact, said medium being fluid under the vulcanizing temperature and at such temperature exerting no deleterious effect on the material being treated, and simultaneously exerting a differential of pressure upon said fluid and upon the interior of the material.

5. The process of vulcanizing a plastic article having incorporated therein the amount of sulfur necessary for its vulcanization, which consists in subjecting the unvulcanized plastic mass to the action of the vulcanizing heat in a medium with which the unvulcanized surface of the mass is in direct contact, said medium being fluid under the vulcanizing temperature and at such temperature exerting no deleterious effect on the material being treated, and exerting a controllable differential of internal and external pressures upon said article.

In testimony whereof, I have hereunto set my hand in the presence of two subscribing witnesses.

RAYMOND B. PRICE.

Witnesses:
A. M. Disch,
Geo. A. Colson.

Copies of this patent may be obtained for five cents each, by addressing the "Commissioner of Patents, Washington, D. C."